UNITED STATES PATENT OFFICE.

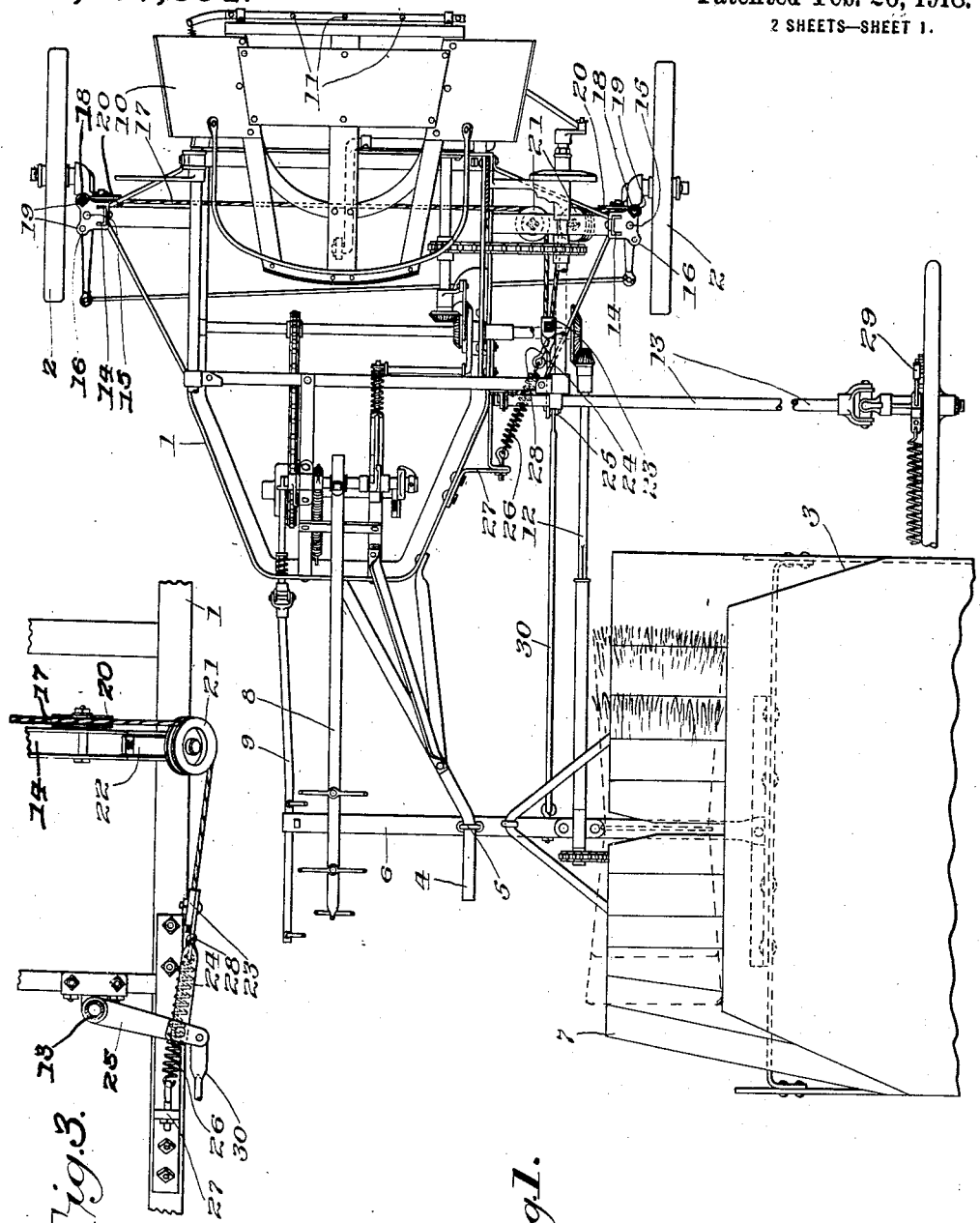

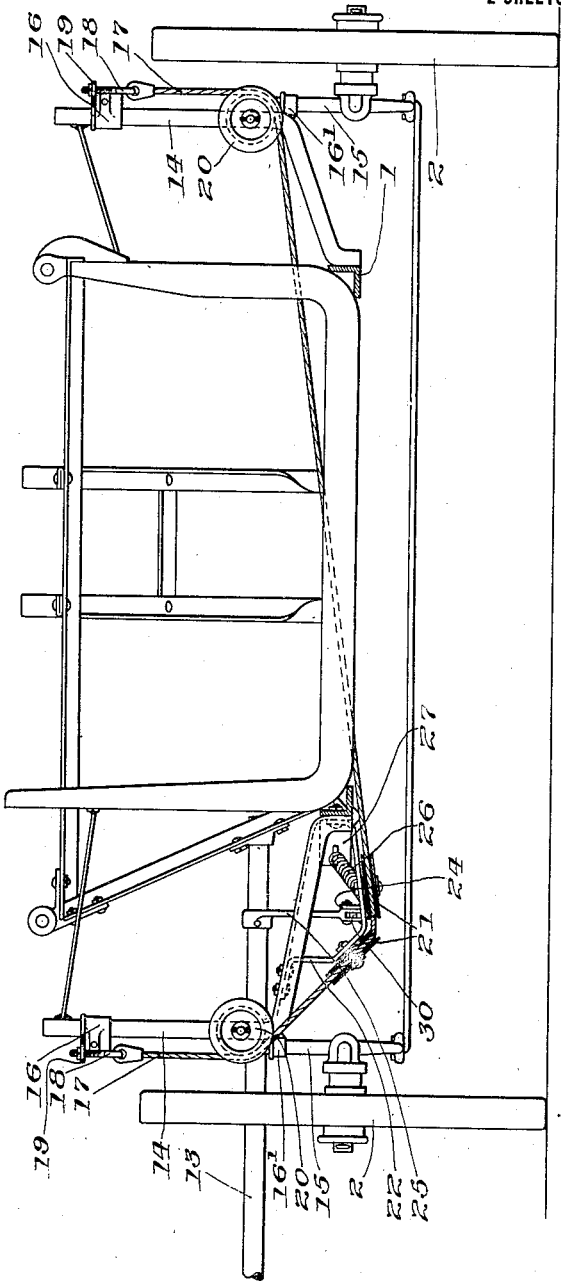

BERT R. BENJAMIN, OF OAK PARK, ILLINOIS, ASSIGNOR TO INTERNATIONAL HARVESTER COMPANY OF NEW JERSEY, A CORPORATION OF NEW JERSEY.

ADJUSTING MECHANISM FOR GRAIN-SHOCKING MACHINES.

1,257,304.   Specification of Letters Patent.   Patented Feb. 26, 1918.

Application filed December 5, 1913, Serial No. 804,841. Renewed August 27, 1917. Serial No. 188,488.

*To all whom it may concern:*

Be it known that I, BERT R. BENJAMIN, a citizen of the United States, residing at Oak Park, in the county of Cook and State of Illinois, have invented certain new and useful Improvements in Adjusting Mechanism for Grain-Shocking Machines, of which the following is a full, clear, and exact specification.

My invention relates to adjusting mechanism for grain shocking machines.

In order that a shocker of the type employing a sheaf delivery member may do its best work while operating under varying grain conditions, it is necessary to adjust the machine longitudinally with respect to the binder deck as the length of the grain varies, so that the shocker sheaf delivery member engages the sheaves at different points in their length, this being done in order to position the sheaves securely upon the sheaf delivery member and have their butts extend a proper distance through the end tines of the shocker cradle. Under certain service conditions it has also been found necessary to adjust the shocker cradle vertically upon the shocker frame in order to properly position the butts of the sheaves in the cradle with respect to the ground and cause them, as the shock is dumped, to be turned at such a height above the ground that the shock may slip freely downward and the butt thereof may embed itself in the ground without any crumpling or bending back of the sheaf butts on the bottom of the cradle or any tendency to overturn the shock. Each of these adjustments has heretofore been made independently of the other, the longitudinal adjustment being made by the operator while on the binder through a lever operable from the operator's seat and operatively connected to the shocker in such a manner as to move the same bodily longitudinally when it is shifted, while the vertical adjustment of the shocker cradle with respect to the shocker frame has been made from the ground by manipulation of any suitable ratchet or other adjustable mechanism interposed between the arms or standards on the wheeled truck and the standards on the cradle. With these two independent adjustments it has been found, however, in practice that the operators are careless in adjusting the machine, with the result that the latter is not able to do its best work under varying grain conditions, the operator in many instances failing to adjust the height of the cradle to correspond to the length of the butt protruding through the end tines thereof.

My invention has for its object to adjust a shocker in an improved manner whereby, by a single adjustment which may be made by the operator while on the binder, the shocker is adjusted longitudinally with respect to the binder so that the sheaf delivery member is brought to the desired position beneath the binder deck and the height of the shocker cradle is adjusted simultaneously so that the base of the shock is always maintained at the desired distance from the ground. I attain these objects by the provision of improved coöperating mechanism operatively connected to a lever within the reach of the operator on the binder and operable by him to adjust the shocker bodily longitudinally and in the same operation raise or lower the axis of the shocker cradle, the butts of the sheaves forming the shock thus always being maintained in such relation to and at such a height from the ground as to enable the shock to drop freely with a downward movement upon the ground in order to embed its butt therein and form a sturdy shock.

In the accompanying drawings I have shown one embodiment which my invention may assume in practice. It is to be understood, however, that the form shown herein for purposes of illustration is susceptible of modification and is described in order that my invention may be shown and described as prescribed by the statutes, my invention proper not being limited to the embodiment chosen as illustrative thereof.

Figure 1 is a top plan view of a shocker and binder equipped with my improvement.

Fig. 2 is a rear elevation of the shocker, the shocker cradle being removed to facilitate clearness of illustration.

Fig. 3 is a detail view of the cradle adjusting mechanism.

The shocker shown is of the well known Raney type, comprising an automatic shocker mounted on a frame 1 mounted on a wheeled truck 2 and trailing at the rear of a binder 3. As shown, the shocker frame 1 is disposed in a substantially horizontal plane and provided with a tongue 4 resting upon and slidably connected at 5 to a support 6 projecting from the stubbleward side of the binder underneath the binder deck 7 thereof, while the shocker mechanism carried on this frame comprises a swinging sheaf delivery member or fork 8 pivotally mounted on the frame 1, an automatic trip 9 controlling said fork, and a rearwardly dumping cradle 10 carried at the rear of the frame having end tines 11 projecting upward across the rear thereof. As the remaining elements of the shocker and operating mechanism therefor are of a well known construction, it seems unnecessary to describe the same in detail herein, it being understood that the fork 8 oscillates back and forth about its pivot to deliver the sheaves ejected from the binder deck 7 to the cradle 10, and deposits the same prostrate therein with their butts extending through the end tines 11, the cradle being dumped rearwardly to discharge a shock formed therein.
As in the usual construction, the power for this operating mechanism is transmitted from the binder to the shocker through a longitudinally adjustable power connection 12 and the shocker frame and binder are operatively connected by draft connections 13. It is also, of course, to be understood that the binder is equipped with the usual sheaf discharging mechanism (not shown) discharging the sheaves from the binder deck in the usual manner.

As shown, the shocker frame 1 is provided with a plurality of upstanding standards 14 at its opposite sides which are spaced apart from the cradle supporting portion of the frame and fixed to coöperating arms of standards 15 on the opposite sides of the wheeled truck 2. In my improved construction the entire shocker frame is movable vertically with respect to these standards 15 by means under the control of the operator on the binder. As shown, each of the movable standards 14 extends through a bracket member 16 carried at the top of the fixed standard 15 which, with coöperating bracket members 16′ fixed to the base of the standards 14, while preventing movement of the frame and standards laterally with respect to the supports 15, nevertheless permit the standards 14, and therefore the shocker frame, to be adjusted vertically as desired, the standard 14 moving through the brackets 16 and the brackets 16′ sliding on the arms 15 on the truck. As shown, this frame 1 is adjusted by means of suitable flexible operating means 17, such as a plurality of cables preferably adjustably connected at their upper ends through eye bolt connections 18 to shoulders 19 formed on the brackets 16 and extending downward therefrom and around sheaves 20 carried on the standards 14 at a point near their lower ends. From these sheaves the cables extend toward the center of the cradle, the cable on the stubbleward side of the machine extending transversely and slightly downwardly across the frame and under the shocker cradle, while the cable on the grainward side of the shocker extends more directly downward and is shorter, both of these cables passing over a pair of angularly disposed adjacent sheaves 21 carried on a supplemental depending support 22 fixed to the rear of the frame 1. As shown, these sheaves 21 are so disposed with respect to the sheaves 20 that the same act to deflect the cables forward. Beyond the sheaves the cables extend in substantially parallel relation to a clip 23, uniting their ends, which is in turn operatively connected through a link 24 to a point intermediate the ends of a depending arm 25 operatively connected to the draft connection 13, as shown in Figs. 1 and 3. Further, in order to assist in the raising and lowering operation, an adjustable coiled spring 26 is connected at its front end to a bracket 27 carried on the front of the shocker frame at a point substantially in front of the inner end of the draft member 13 and connected at its rear end to a hook 28 attached to the rear end of the link 24. As in the usual manner, the draft connection 13 is adjustable through a lever 29, extending upward from its grainward or binder end in such a manner as to be readily accessible to the operator seated on the binder and the arm 25 of the member 13 is pivotally connected to the rear end of a longitudinally extending draft link 30 pivoted at its front end to the support 6.

The operation of the construction shown is as follows: Let us assume that the binder is operating in short grain and moves into long grain, a long sheaf of substantially the length indicated on Fig. 1 being discharged from the binder deck. In delivering such a sheaf to the shocker cradle, it is desirable that the fork 8 be so adjusted with respect to the band of the sheaf that it will engage the latter at such a point between its ends as to position the sheaf securely thereon. For instance, with such a sheaf it has been found that the lever 29 should be so operated as to move the sheaf delivery member 8 longitudinally rearward in such a manner as to cause its tines to engage the sheaf at a point nearer its head. Obviously, such movement of the fork with respect to the sheaves will result in the butts of the sheaves extending a greater distance through the end tines in a position which would result in the butts of the sheaves on the cradle striking the ground prematurely as the shock is dumped if the cradle was still in its lowermost or short grain position.
However, as the lever 29 is adjusted thus to position the fork, in my improvement the entire shocker frame 1 is raised through the connection of the frame adjusting mechanism and the adjustable draft member 13, the frame being lifted in such a manner that the cradle will be raised to a degree necessary to maintain the butts of the sheaves protruding through its end tines at the desired height from the ground. Conversely, when working in short grain, the fork and cradle will obviously be simultaneously operated in the opposite direction so that the shorter sheaves will also be securely positioned with respect to the fork and the axis of the cradle will be lowered in such a manner that any tendency to overturn the short shock will be eliminated, while at the same time the butts will be turned at such a distance above the ground as to enable the shock to drop freely and drive its butts into the ground in such a manner as to form a substantial shock.

It is to be noted that by this construction I am able to provide means operating simultaneously with the adjusting lever for adjusting the shocker longitudinally, which insure the simultaneous positioning of the shocker frame or cradle with respect to the sheaves so that the correct longitudinal-vertical relation between the fork and cradle is always maintained, the height of the cradle being so adjusted with respect to the ground that as the shock is discharged there is always a proper space for turning the shock in such a manner as to let its butts engage the ground in the most satisfactory way. Attention is further directed to the fact that this mechanism is entirely automatic in its action and that by a simple adjustment of a single lever readily accessible to the operator, the possibility of the operator building shocks in the cradle which will not stand is avoided, the axis of the shocker cradle being so raised and lowered that, regardless of the distance which the operator lets the sheaves project beyond the end tines, the cradle will be turned in such a manner as always to position the shock properly with respect to the ground. It is further to be noted that by this construction I am able to minimize the effect of a negligent or ignorant operator operating the machine, the operator only having to maintain the fork tines in proper relation to the bundle bands when working in grain of different lengths, the rest of the adjustment being entirely automatic. Attention is further directed to the fact that by my improvement the work of the operator is facilitated and the capacity of the machine is increased due to the fact that it is unnecessary for the operator to stop the machine and dismount whenever the cradle requires adjustment, this being readily done while the machine is in motion, preferably just after the discharge of a shock, although it can be done at any time by the use of an assisting spring of the proper strength. I am also able to do away with the necessity for providing separate independently operable means to vary the height of the cradle with respect to its support.

While I have in this application described one form of my invention, it is to be understood, as hereinbefore set forth, that the same may be modified without departing from the spirit of my invention and adapted to shockers of other types or makes and that I intend to include herein all such modifications.

What I claim as my invention and desire to secure by Letters Patent is:

1. In combination, a binder, a shocker operatively connected thereto, and means operable from the binder for adjusting the height of said entire shocker.

2. In combination, a binder, a shocker operatively connected thereto, a cradle carried on said shocker, and means operable from said binder for adjusting the height of said cradle while maintaining the same substantially parallel to the ground.

3. In combination, a binder, a shocker operatively connected thereto, and means for simultaneously adjusting said shocker longitudinally and vertically with respect to said binder.

4. In combination, a binder, a shocker operatively connected thereto, and means operable from said binder for adjusting said shocker longitudinally and vertically with respect thereto.

5. In combination, a binder, a shocker operatively connected thereto, and means operable from said binder for simultaneously adjusting said shocker longitudinally and vertically with respect thereto.

6. In combination, a binder, a shocker operatively connected thereto, a sheaf delivery member and a cradle on said shocker, and means for simultaneously adjusting the delivery member of said shocker longitudinally and the cradle thereof vertically.

7. In combination, a binder, a shocker operatively connected thereto, a sheaf delivery member and a cradle on said shocker, and means operable from the binder for simultaneously adjusting the delivery member of said shocker longitudinally and the cradle of said shocker vertically.

8. In combination, a binder, a shocker operatively connected thereto, a sheaf delivery member and a cradle on said shocker, and means operable from said binder for raising the cradle of said shocker and moving the delivery member thereof rearward relative to said binder.

9. In combination, a binder, a shocker operatively connected thereto, a sheaf delivery member and a cradle on said shocker, and means for simultaneously lowering the cradle of said shocker and moving the delivery member thereof forward relative to said binder.

10. In combination, a binder, a shocker operatively connected thereto, a swinging sheaf delivery member and a cradle on said shocker, and means under the control of the operator on the binder for adjusting the delivery member of said shocker longitudinally and the cradle thereof vertically.

11. In combination, a binder, a shocker operatively connected thereto, a swinging sheaf delivery member and cradle on said shocker, and means for simultaneously adjusting the delivery member thereof longitudinally with respect to said binder and the cradle thereof vertically with respect to the ground.

12. In combination, a binder, a shocker operatively connected thereto, an operating member movable from said binder, and operative connections controlled by said member for bodily adjusting said entire shocker vertically with respect to said binder.

13. In combination, a binder, a wheeled shocker truck, a shocker frame carried thereon and adjustable with respect thereto, the shocker frame being operatively connected to said binder, and means operable from said binder for bodily adjusting said entire shocker frame with respect to said wheeled truck.

14. In combination, a binder, a shocker operatively connected thereto, a swinging sheaf delivery member and a cradle on said shocker, means for varying the point of engagement of the delivery member thereof with the sheaves discharged from said binder, and means automatically operated thereby simultaneously adjusting the height of the shocker cradle.

15. In combination, a binder, a shocker frame operatively connected thereto, a swinging sheaf delivery member carried thereon, means for adjusting said delivery member relatively to said binder, and means adjusting the shocker frame vertically as said sheaf delivery member is adjusted.

16. In combination, a binder, a wheeled truck, a shocker frame carried thereon and operatively connected to said binder, a rearwardly dumping cradle carried on said frame, and means operable from the binder for adjusting the height of said entire frame and cradle relative to the ground.

17. In combination, a binder, a wheeled truck, a shocker frame carried thereon and operatively connected to said binder, and a sheave and cable mechanism operatively connected between said frame and said truck and controlled by the operator on said binder for adjusting said frame vertically with respect to said truck.

18. In combination, a binder, a wheeled shocker truck, a shocker frame carried thereon and operatively connected to said binder, a lever carried on said binder, and operative connections between said lever, shocker frame and truck operable upon actuation of said lever to vary the height of said frame with respect to said truck.

19. In combination, a binder, a shocker operatively connected thereto comprising a wheeled truck, a frame carried on said truck, a rearwardly dumping cradle carried on said frame and adjustable therewith with respect to said truck, a sheaf delivery member carried on said frame, upstanding end tines at the rear of said cradle, means for adjusting said delivery member relative to the butts of the sheaves discharged from said binder whereby the length of the butts extending through said end tines may be varied, and means for simultaneously moving said cradle upward or downward with respect to the ground.

20. In combination, a binder, a wheeled truck having upstanding spaced arms, a shocker frame operatively connected to said binder and located between said truck arms having standards operatively connected to said arms and adjustable vertically with respect thereto, a sheave carried on each of said standards, a plurality of adjacent sheaves carried on said frame, a plurality of cables fixed to said arms and extending over said sheaves toward the front of the machine, and operating mechanism operatively connected to the front ends of said cables and controlled by an operator on the binder for pulling said cables and adjusting the height of said frame with respect to said truck.

21. In combination, a binder, a wheeled truck, a shocker frame carried on the latter and operatively connected to said binder, said wheeled truck having upstanding arms on opposite sides of said frame and said frame having standards vertically slidable with respect to said arms, a plurality of sheaves mounted on said standards intermediate their ends, flexible lifting means fixed at one end to said arms and extending over said sheaves and transversely across the shocker frame, a plurality of deflecting sheaves carried on said frame around which the flexible means extend and pass toward the front of the machine, and means operable from said binder to adjust said cables.

22. In combination, a binder, a wheeled truck, a shocker frame carried on the latter and operatively connected to said binder, said wheeled truck having upstanding arms on opposite sides of said frame and said frame having standards vertically slidable with respect to said arms, a plurality of sheaves mounted on said standards intermediate their ends, flexible lifting means fixed at one end to said arms and extending over said sheaves and transversely across the shocker frame, a plurality of deflecting sheaves carried on said frame around which the flexible means extend and pass toward the front of the machine, a transversely disposed draft member revolubly mounted on said binder and shocker frame and operatively connected to the front end of said flexible means, and means operable from said binder for rotating said draft member and adjusting said flexible means longitudinally to vary the height of said frame with respect to said truck.

23. In combination, a binder, a wheeled truck, a shocker frame carried on the latter and operatively connected to said binder, said wheeled truck having upstanding arms on opposite sides of said frame and said frame having standards vertically slidable with respect to said arms, a plurality of sheaves mounted on said standards intermediate their ends, flexible lifting means fixed at one end to said arms and extending over said sheaves and transversely across the shocker frame, a plurality of deflecting sheaves carried on said frame around which the flexible means extend and pass toward the front of the machine, a transversely disposed draft member revolubly mounted on said binder and shocker frame and operatively connected to the front end of said flexible means, means operable from said binder for rotating said draft member and adjusting said flexible means longitudinally to vary the height of said frame with respect to said truck, and supplemental means carried on said shocker frame assisting the operator in this operation.

24. In combination, a binder, a wheeled truck, a shocker frame carried on said truck and operatively connected to said binder, said wheeled truck having upstanding arms on opposite sides of said frame and said frame having standards vertically slidable with respect to said arms, a plurality of sheaves mounted on said standards intermediate their ends, flexible lifting means fixed at one end to said arms and extending over said sheaves, a plurality of angularly disposed adjacent deflecting sheaves carried on said frame around which the flexible means extend and pass toward the front of the machine, a transversely disposed draft member revolubly mounted on said binder and shocker frame and operatively connected to the front end of said flexible means, means operable from the binder for rotating said draft member and adjusting said flexible means longitudinally to vary the height of said frame with respect to said truck, and a spring operatively connected between said frame and the end of said flexible means assisting in this operation.

In testimony whereof I affix my signature, in the presence of two witnesses.

BERT R. BENJAMIN.

Witnesses:
RAY D. LEE,
FRANK A. ZABILKA.